United States Patent
Fang et al.

(10) Patent No.: US 8,873,565 B2
(45) Date of Patent: Oct. 28, 2014

(54) METHOD AND APPARATUS OF DELIVERING UPSTREAM DATA IN ETHERNET PASSIVE OPTICAL NETWORK OVER COAXIAL NETWORK

(75) Inventors: Liming Fang, Santa Clara, CA (US); Jim Chen, Corona, CA (US); Kira Zhang, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 214 days.

(21) Appl. No.: 13/447,748

(22) Filed: Apr. 16, 2012

(65) Prior Publication Data

US 2013/0272703 A1 Oct. 17, 2013

(51) Int. Cl.
*H04L 12/56* (2006.01)

(52) U.S. Cl.
USPC ............ 370/395.4; 370/389; 370/395.5; 370/465; 370/468

(58) Field of Classification Search
None
See application file for complete search history.

(56) References Cited

U.S. PATENT DOCUMENTS

| | | | |
|---|---|---|---|
| 5,886,981 A | 3/1999 | Kamiya | |
| 2003/0091045 A1 | 5/2003 | Do-In et al. | |
| 2013/0232537 A1* | 9/2013 | Montojo et al. | 725/129 |
| 2013/0236178 A1* | 9/2013 | Garavaglia et al. | 398/67 |
| 2013/0239165 A1* | 9/2013 | Garavaglia et al. | 725/129 |

FOREIGN PATENT DOCUMENTS

| | | |
|---|---|---|
| CN | 1417982 A | 5/2003 |
| CN | 102195838 A | 9/2011 |
| WO | 2011031831 A1 | 3/2011 |

OTHER PUBLICATIONS

Broadcom, "Broadcom Introduces DOCSIS-based EoC for EPON Product Portfolio in Support of China's Network Convergence," Oct. 27, 2010, 3 pages.
"Operating the EPON Protocol Over Coaxial Distribution Networks Call for Interest," IEEE 802.3 Ethernet Working Group, Nov. 8, 2011, 38 pages.
Foreign Communication From a Counterpart Application, PCT Application No. PCT/CN2013/074235, International Search Report dated Jul. 25, 2013, 7 pages.
Foreign Communication From a Counterpart Application, PCT Application No. PCT/CN2013/074235, Written Opinion dated Jul. 25, 2013, 4 pages.
Stascheit, B., et al., "The Use of Ethernet-Over-Coax in HFC Networks," Scientific Atlanta, A Cisco Company, Transmission Technologies, G1661A, Dec. 2007, 5 pages.
"DOCSIS EoC for EPON in China," Oct. 2010, 14 pages.
"HomePNA Modem for MDU Endpoints," CG3310M, Sigma Designs, May 21, 2012, 2 pages.

* cited by examiner

*Primary Examiner* — Donald Mills
(74) *Attorney, Agent, or Firm* — Conley Rose, P.C.; Grant Rodolph; Brandt D. Howell

(57) ABSTRACT

An apparatus for interconnecting a fiber-optic network and a coax network comprising a coax line terminal (CLT) configured to couple to an optical line terminal (OLT) at the fiber-optic network and a plurality of coax network units (CNUs) at the coax network and to cache data received from the CNUs and forward the cached data to the OLT upon receiving a message from the OLT that assigns a transmission cycle for a specified CNU, wherein the CLT forwards the cached data to the OLT upon receiving the message regardless of whether the cached data corresponds to the specified CNU.

20 Claims, 8 Drawing Sheets

METHOD AND APPARATUS OF DELIVERING UPSTREAM DATA IN ETHERNET PASSIVE OPTICAL NETWORK OVER COAXIAL NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Coaxial cable networks (also referred to herein as coax networks) have been widely deployed, e.g., in the past two to three decades. The coaxial cable can provide Gigabit digital bandwidth that is typically sufficient for broadband access demand. Although Time Domain Multiplexing (TDM) Passive Optical Network (PON) based Fiber-to-the-home (FTTH) systems are emerging, due to the relatively high cost of such systems, coax networks are still serving many broadband customers today. To support legacy systems and save investment cost in new infrastructure, integrating some of the coaxial cable infrastructure with the PON infrastructure is desirable, such as connecting coax network components at the home end to PON components at the distribution network and central office. Ethernet PON (EPON) is one PON technology that uses Ethernet protocol and frames for communications and can provide Gigabit bandwidth. EPON over Coax (EPoC) technologies are being considered to integrate EPONs and coax networks and hence benefit from both technologies and infrastructures.

SUMMARY

In one embodiment, the disclosure includes an apparatus for interconnecting a fiber-optic network and a coax network comprising a coax line terminal (CLT) configured to couple to an optical line terminal (OLT) at the fiber-optic network and a plurality of coax network units (CNUs) at the coax network and to cache data received from the CNUs and forward the cached data to the OLT upon receiving a message from the OLT that assigns a transmission cycle for a specified CNU, wherein the CLT forwards the cached data to the OLT upon receiving the message regardless of whether the cached data corresponds to the specified CNU.

In another embodiment, the disclosure includes a network component for interconnecting a fiber-optic network with a coax network in a PON over coax system comprising a receiver configured to receive data from one or more CNUs in the coax network and a first message from OLT of the PON that indicates a specified CNU, a buffer configured to cache the received data, a processor configured to map an upstream transmission time window indicated in the first message according to a first transmission schedule of the OLT to an upstream transmission time slot according to a second transmission schedule of the network component, and a transmitter configured to forward the cached data in the buffer to the OLT upon receiving the first message and send a second message that comprises the mapped upstream transmission time slot to the CNUs.

In yet another embodiment, the disclosure includes a method implemented by an apparatus for interconnecting a fiber-optic network and a coax network comprising receiving data from a CNU at the coax network, caching the received data in a local buffer, receiving from an OLT at the fiber-optic network a first message that assigns an upstream transmission window for a specified CNU based on a first time schedule of the OLT, and forwarding the cached data in the buffer to the OLT regardless of whether the specified CNU matches the CNU corresponding to the cached data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
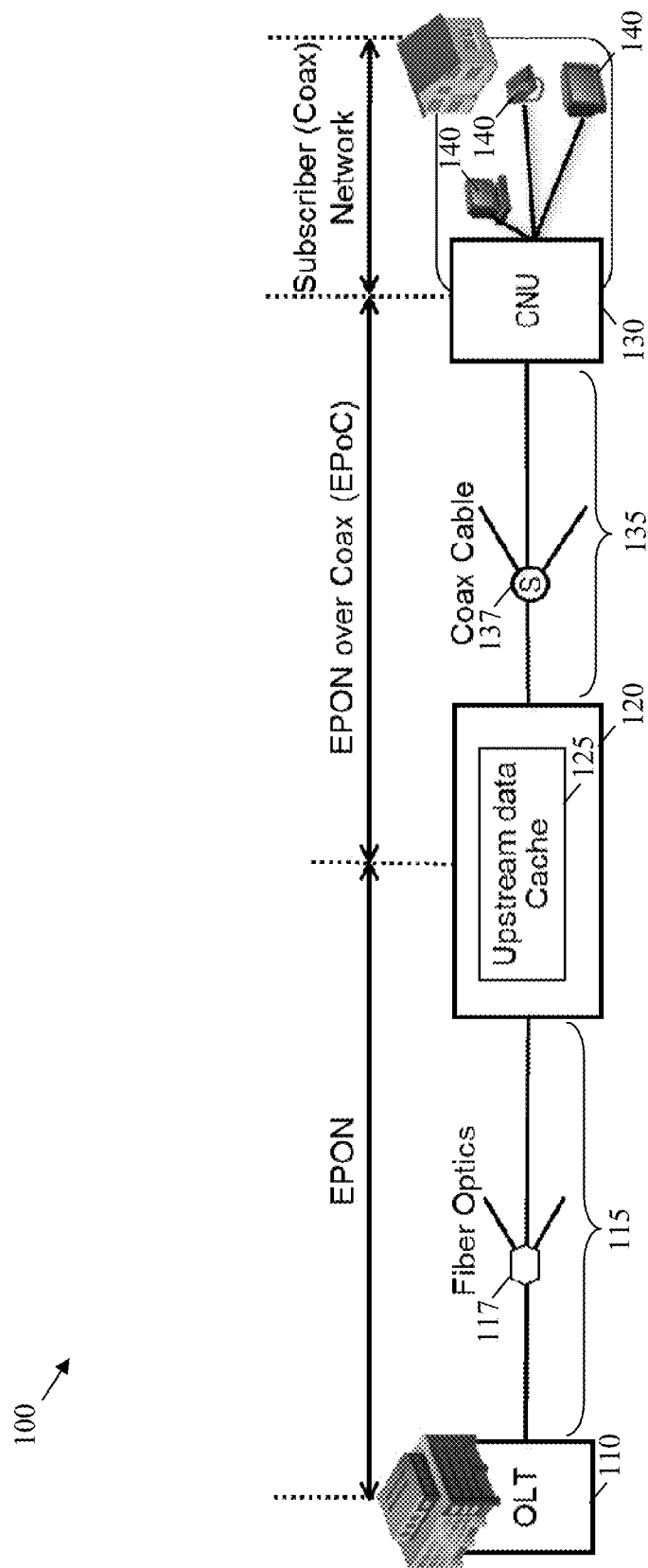
FIG. 1 is a schematic diagram of an embodiment of an EPoC system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Multiple Ethernet over Coax (EoC) technologies and standards that have been used for in-home transmission have also been adapted to enable outdoor coax access from a PON Optical Network Unit (ONU) to an EoC Head End, which may be a PON OLT. Examples of such EoC technologies include Multimedia over Coax Alliance (MoCA), the International Telecommunication Union Telecommunication Standardization Sector (ITU-T) G.hn standards, the Home Phoneline Networking Alliance (HPNA), and Home Plug Audio/Video (A/V). Outdoor coax access may be enabled using customer premise equipment (CPE) located at the subscriber home. The OLT may be coupled to one or more CPEs via a corresponding CNU at the coax network side. The OLT may communicate with a plurality of CNUs via a CLT that may be positioned between the PON and the coax network. However, these technologies may not offer end-to-end Fiber to Coax scheduling for transferring upstream data from the CNU on the coax network to the CLT and OLT at the fiber-optic network.

Using EPON for coax cable access is being proposed by Multiple System Operators (MSOs) worldwide, where the EPON may be used for last few hundred meters access for EPoC. EPON is a PON standard developed by the Institute of Electrical and Electronics Engineers (IEEE) and specified in IEEE 802.3ah. EPON may provide a relatively simple and flexible way of using optical fiber for last mile broadband service. The EPON may comprise an OLT configured to transmit Ethernet frames at an EPON Media Access Control (MAC) layer. The OLT may implement a Multi-Point Control Protocol (MPCP) that performs bandwidth assignment, bandwidth polling, auto-discovery, and ranging. Ethernet frames may be broadcasted from the OLT downstream to a plurality of ONUs based on Logical Link Identifiers (LLIDs) assigned to corresponding ONUs. The LLIDs may be embedded in the preamble of the transmitted frames.

Typically in the EPON, upstream bandwidth for the different ONUs may be assigned by sending Gate messages from the OLT to the ONUs. The OLT may determine upstream transmission time windows for the ONUs by sending the ONUs' LLIDs in subsequent Gate messages. Each Gate may be used to assign a transmission or polling cycle based on the MPCP. When an ONU receives a Gate message that comprises the ONU's associated LLID, the ONU may begin transmitting data upstream to the OLT. Similarly, other ONUs may transmit their data upstream in turn upon receiving their LLIDs in subsequent Gate messages from the OLT. The ONUs may also send Report messages to the OLT to request upstream bandwidth. The Report messages may also comprise LLIDs that indicate the requesting ONUs. This upstream bandwidth assignment scheme may also be implemented for EPoC technology, where the Gate messages may be relayed between the OLT and the ONUs via an EPoC network.

Disclosed herein is a system and method for improving upstream data transmission in an EPoC based system or any other integrated PON and coax system. The upstream data may be sent from a coax network to an EPON or other fiber based network (other PON) that is coupled to the coax network. The system may comprise an OLT at the EPON (or PON), a CLT positioned between the EPON (or PON) and the coax network, and one or more CNUs coupled to one or more customer devices (or CPEs) at the coax network. The CLT may be configured to receive and cache data from the CNUs. The CLT may then forward the data in the upstream direction to the OLT upon receiving a Gate message from the OLT, regardless of whether the data is from the ONU associated with the LLID in the Gate message or not. As such, the upstream data from the CNUs may be transmitted to the OLT without synchronizing upstream data transmission from the CNUs with the OLT.

The CLT may be configured to allocate upstream transmission time slots for the CNUs, which may correspond to assigned time windows from the OLT that are indicated in the Gate messages. The amount of data cached for different CNUs may match the corresponding allocated time slots at the CLT. As such, the OLT may receive about the same indicated amount of data (or data bandwidth) per upstream transmission cycle. However, the OLT may not necessarily receive the upstream data for the CNUs at the CNU's indicated time windows in the Gate messages. Since this upstream transmission scheme is asynchronous, the scheme may not require timing components, which may reduce cost and simplify transmissions. Further, since the CLT forwards the cached data for any CNU upstream upon receiving a Gate message from the OLT regardless of the LLID value in the Gate message, the data transmission cycles for the CNUs may be reduced.

FIG. 1 illustrates an embodiment of an EPoC system 100. The EPoC system 100 may comprise an OLT 110 located at an EPON side, at least one CNU 130 coupled to a plurality of CPEs 140 at a coax (subscriber) network side, and a CLT 120 positioned between the OLT 110 and the CNU 130, e.g., at an EPoC between the EPON and the coax network. The OLT 110 may be coupled via a fiber distribution network or Optical Distribution Network (ODN) 115 to one or more CLTs 120, and optionally to one or more ONUs (not shown), of the EPON. The fiber distribution network or ODN 115 may comprise fiber optics and an optical splitter 117 that couples the OLT 110 to multiple CLTs/ONUs, including the CLT 120. The CLT 120 may be coupled to a plurality of CNUs 130 via coax cables 135 and a cable splitter 137. Although FIG. 1 shows one CLT 120 and one CNU 130, the EPoC system 100 may comprise any number of CLTs 120 and corresponding CNUs 130. The components of the EPoC system 100 may be arranged as shown in FIG. 1 or any other suitable arrangement.

The OLT 110 may be part of the EPON and may be any device configured to communicate with the CNUs 130 via the CLT 120. The OLT may communicate with one or more CLTs 120 and optionally with one or more ONUs (not shown) using optical signals transported via the fibers of the ODN 115. The OLT 110 may act as an intermediary between the CNUs 130 and another network (not shown). The OLT 110 may forward data received from the other network to the CNUs 130, and forward data received from the CNUs 130 onto the other network. Although the specific configuration of the OLT 110 may vary depending on the type of PON or EPON, in an embodiment, the OLT 110 may comprise a transmitter and a receiver. When the other network is using a network protocol that is different from the protocol used in the EPON, the OLT 110 may comprise a converter that converts the other network protocol into the EPON protocol. The OLT converter may also convert the EPON protocol into the other network protocol.

The CLT 120 may be any device or component configured to forward downstream data from the OLT 110 to the corresponding CNUs 130 and forward upstream data from the CNUs 120 to the OLT 110. The CLT 120 may convert the downstream and upstream data appropriately to transfer the data between the optical fiber and the coax cable. The data transferred over the fiber (of the ODN 115) may be transmitted or received in the form of optical signals, and the data transferred over the coax cables 135 may be transmitted or received in the form of electrical signals. The CLT 120 may also encapsulate or frame the data in the fiber-optic network side and coax network side differently. The CLT 120 may comprise a storage medium (e.g., a hard drive or memory) that acts as a cache (or buffer) for caching upstream data from the CNUs 130 to the OLT 110. The CLT 120 may dedicate an upstream data cache 125 for the CNUs 130, which may be any suitable portion of the storage medium or memory.

The CNUs 130 may be any devices configured to transport data between the CLT 120 and the corresponding CPEs 140. The CNU 130 may combine the data from a plurality of corresponding CPEs 140 (e.g., at the same home) and send the data upstream to the CLT 120. The CNU 130 may also receive data from the CLT 120 and distribute the data downstream to the corresponding CPEs 140. Examples of the CNUs 130 include set top boxes, home (wireless) routers, and modems. The CPEs 140 may be any wired or wireless communications device or component that may be used to receive and send data, such as computer desktops, laptops, tablets, phones, and smartphones. In other embodiments, the OLT 110, CLT 120, and CNUs 130 described above may be part of any integrated PON and coax network other than the EPoC, where the PON may be any PON other than an EPON, such as a Gigabit PON (GPON) or another type of TDM PONs.

In the case of upstream data transmissions, the CLT 120 may cache the data received from any of the CNUs 130 at the upstream data cache 125 before forwarding the data upstream to the OLT 110. The CLT 120 may forward the cached data from the upstream data cache 125 after receiving a Gate message from the OLT 110 without matching the forwarded data to the LLID in the Gate message. The cached data may be forwarded upstream regardless of the indicated LLID from the OLT 110 and may or may not correspond to the CNU 130 associated with the LLID in the Gate message. This may remove the synchronization of upstream transmissions between the coax network and the fiber-optic network, which may simplify communications and reduce cost. Further, since the CNU's upstream data may be forwarded from the CLT upon receiving any Gate message, the CNU's cached data may be forwarded before receiving the CNU's intended Gate message. Thus, the CNU's cached data may be transmitted upstream with reduced delay, which may reduce the upstream data transmission cycle for the CNU.

Figure 2:
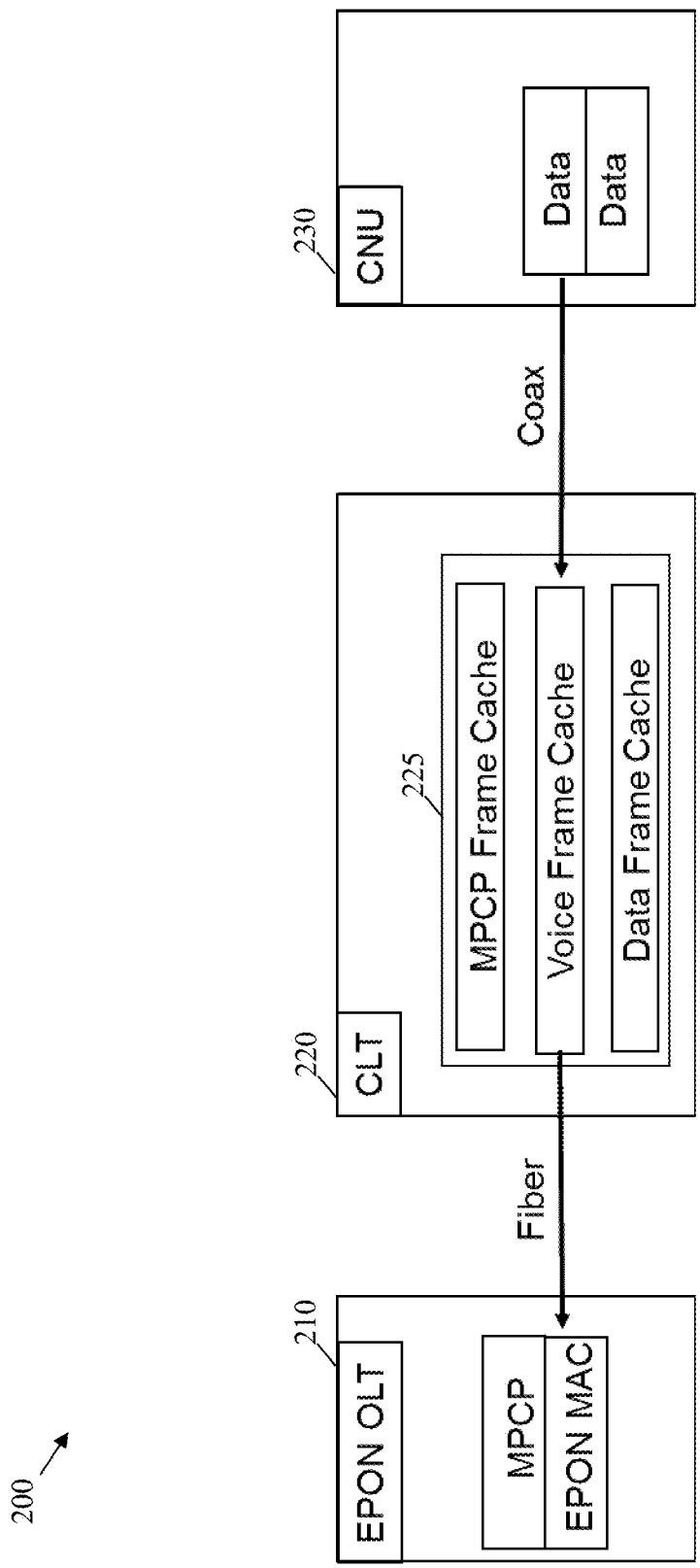
FIG. 2 is a schematic diagram of another embodiment of an EPoC system.

FIG. 2 illustrates another embodiment of an EPoC system 200. The EPoC system 200 may comprise an OLT 210 (e.g., at an EPON side), a CNU 230 (at a coax network side), and a CLT 220 positioned between the OLT 210 and the CNU 230. The OLT 210, CLT 220, and CNU 230 may be configured similar to the OLT 110, CLT 120, and CNU 130, respectively. The OLT 210 may be configured to assign an upstream data transmission time window for each CNU 230 according to the MPCP. The upstream data may be received by the OLT 210 at an EPON MAC (or physical) layer. The CLT 220 may comprise a plurality of upstream data caches 225 for caching upstream data from the CNUs 230, which may have different assigned priority levels. The upstream data caches 225 may be used for caching different priority of data frames from the CNUs 230. For instance, the data frames from the CNUs 230 may comprise MPCP (control) frames that may have high priority, voice frames that may have medium priority, and other data frames that may have low priority. The different priority data frames may be cached in corresponding caches 225, such as in a MPCP frame cache, a voice frame cache, and a data frame cache, respectively.

The OLT 210 may send a Gate message to the CLT 220 to assign an upstream data transmission time window for one or more CNU 230. The CLT 220 may process the Gate message to map a corresponding upstream transmission time slot to one or more CNU 230, which may include the same or different CNUs 230 than indicated in the Gate message. The CLT 220 may allocate one or more upstream transmission time slots to one or more CNUs 230 that may be about equal to the upstream data transmission time window indicated in the Gate message. However, the upstream transmission time slot(s) may be assigned or scheduled differently in time than the time schedule of the OLT 210. The CLT 220 may send the mapped upstream transmission time slot(s) to the corresponding CNU(s) 230 using a coax message, which may be broadcast to the CNUs 230. Any type of suitable message in the coax network that indicates the mapped upstream transmission time slot(s) to the CNUs is referred to herein as a Map message. Hence, for each received Gate message from the OLT, a coax Map message may be sent to the corresponding CNU(s) 230. The CNUs 230 may then send the upstream data according to the CNUs' assigned upstream transmission time slots.

The CLT 220 may allocate the upstream data transmission time slots for the different CNUs according to a local time scheduling of the CLT 220, which may be independent from the OLT's time scheduling. For example, the upstream data transmission time slots may be allocated to the CNUs according to the schedule of cached data at the CLT 220 from the different CNUs 230, where for higher priority received and cached data may be scheduled first. Thus, the cached data may be forwarded to the OLT 210 from the higher priority upstream data caches 225 first, e.g., as long as the amount of forwarded data matches the assigned time slots. This may also decouple the scheduling of upstream data transmissions from the OLT's assigned schedule for upstream data transmissions. As described above, the upstream data transmission bandwidths from the OLT 210 may still be preserved, since the time slots assigned by the CLT 220 may be about equal to the time windows assigned by the OLT 210.

Figure 3:
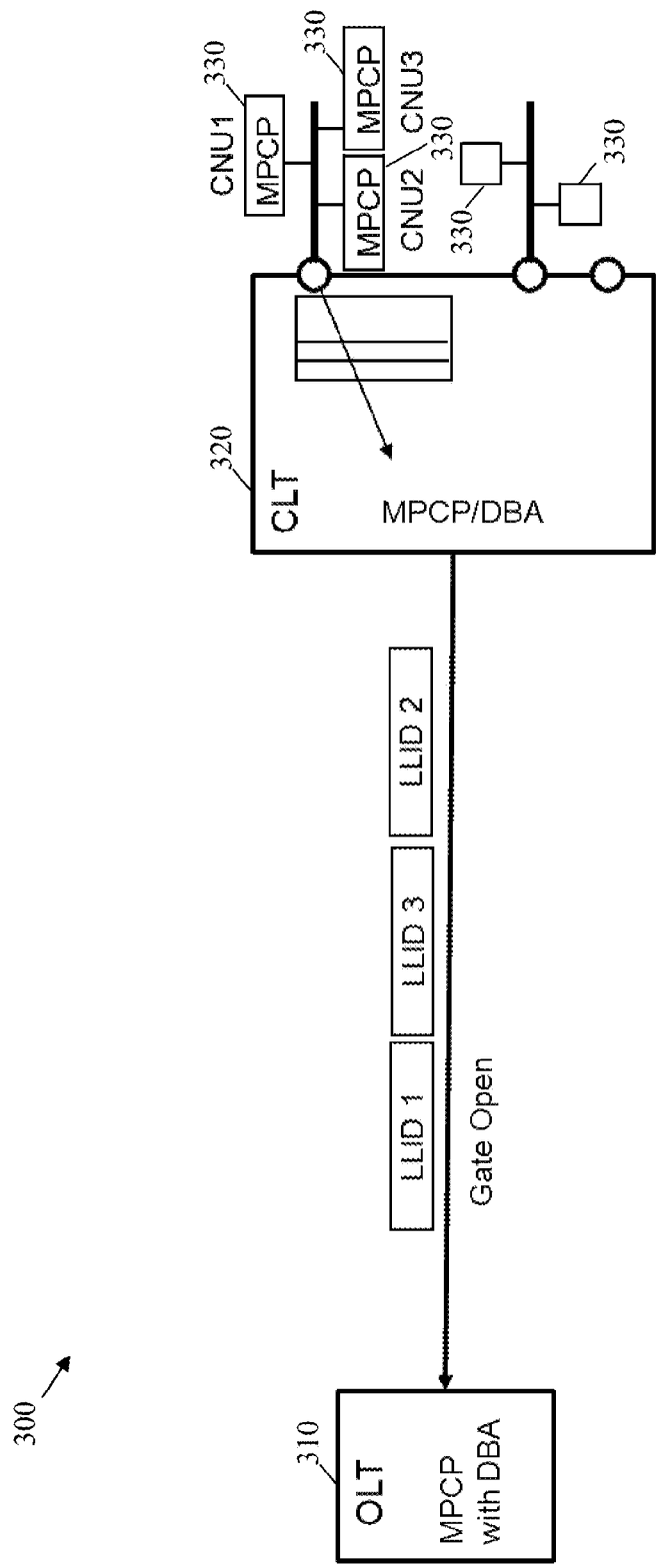
FIG. 3 is a schematic diagram of an embodiment of an EPoC system.

FIG. 3 illustrates another embodiment of an EPoC system 300. The EPoC system 300 may comprise an OLT 310, a CLT 320, and a plurality of CNUs 330, which may be configured as described above. The OLT 310 may use the MPCP with dynamic bandwidth allocation (DBA), to schedule upstream data transmissions for the CNUs 330. Specifically, the OLT 310 may send a plurality of Gate messages that indicate a plurality of LLIDs and designated time windows for the corresponding CNUs 330. The Gate messages may be sent subsequently from the OLT 310 to the CLT 320 according to the OLT's determined schedule for upstream data transmissions from the CNUs 330. The MPCP scheduling at the OLT 310 may be implemented with DBA, where the OLT 310 may reschedule the upstream data transmissions for the CNUs 330 by resending additional Gate messages to accommodate to changing fiber-optic network (e.g., EPON) conditions, such as changes in available bandwidth, failures, or traffic congestion.

Upon receiving each Gate message from the OLT 310, the CLT 320 may also use the MPCP with DBA to schedule upstream data transmissions for the CNUs 330 based on the designated time windows in the Gate messages. The CLT 320 may map the time windows for the CNUs 330 to corresponding time slots to reschedule the upstream data transmissions for the CNUs 330. Specifically, the CLT 320 may map each time window for each CNU 330 to a comparable amount of time slots according to the CLT's determined schedule for upstream data transmissions from the CNUs 330. The CLT's schedule may be based on cached data conditions (and optionally other local CLT or coax network resource conditions), such as the order and amount of cached data from the different CNUs 330. The CLT 320 may send a plurality of Map messages that indicate the designated time slots (and LLIDs) for the corresponding CNUs 330. The Map messages may be sent from the CLT 320 to the CLTs 320 after or upon receiving the corresponding Gate messages from the OLT 310. The Map messages may indicate time slots for the corresponding CNUs 330 that may be about equal to the indicated time windows in the Gate messages for the CNUs 330. However, the Map messages may indicate a different order for upstream transmissions from the CNUs 330 than indicated in the Gate messages.

For example, the OLT 310 may send to the CLT 320 subsequent Gate messages that indicate the LLID values, LLID1, LLID3, and LLID2, for three corresponding CNUs 330, CNU1, CNU3, and CNU2, respectively, to schedule upstream data transmissions in that order according to the OLT's schedule. Hence, the CLT 320 may transmit three corresponding subsequent Map messages for CNU1, CNU2, and CNU3, respectively, to schedule upstream data transmissions in that modified order according to the CLT's schedule. The CLT 320 may send one Map message at a time for each received Gate message.

Each of the CNUs 330 may return upstream data to the CLT 320 according to the designated time slots in the received Map messages. The CLT 320 may cache the data, e.g., for some time, and subsequently send the cached data upstream to the OLT 310 upon receiving a Gate message regardless of the LLID indicated in the Gate message, as described above. The cached data may be sent upstream to the OLT 310 in the order the data was received and cached from the CNUs 330, such as on a first in first out (FIFO) basis. This order may correspond to the CLT's scheduled and indicated time slots in previously sent Map messages to the CNUs 330. The CLT 320 may send upstream cached data corresponding to one Map message at a time upon receiving each Gate message.

Figure 4:
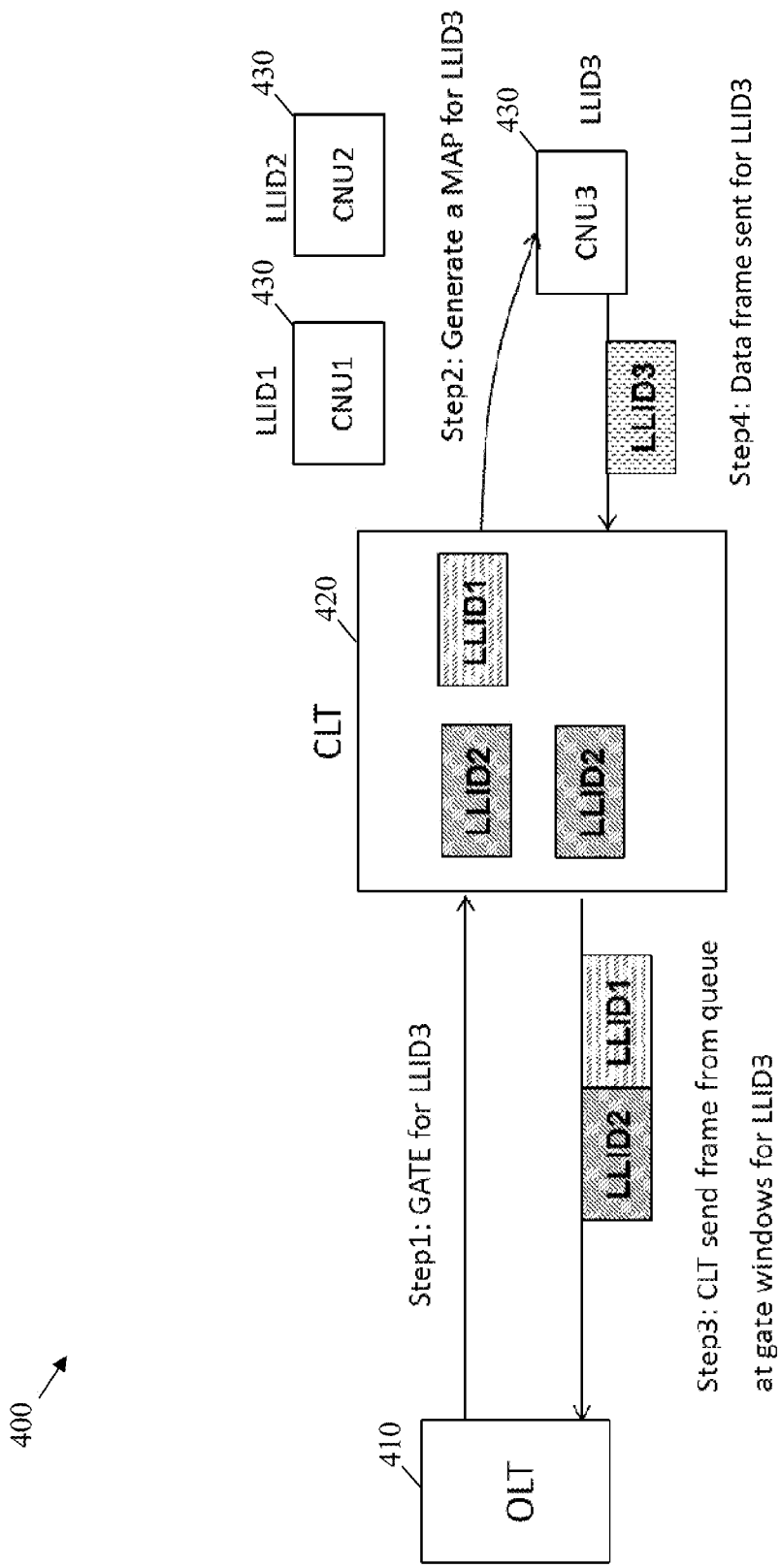
FIG. 4 is a schematic diagram of an embodiment of an EPoC upstream transmission scheme.

FIG. 4 illustrates an embodiment of an EPoC upstream transmission scheme 400, which may be implemented in the EPoC systems described above. The EPoC upstream transmission scheme 400 may be implemented by an OLT 410, a CLT 420, and a plurality of CNUs 430, which may be configured as described above. Initially, the OLT 410 may send to the CLT 420 a Gate message that indicates a LLID for one of the CNUs 430, e.g., LLID3 for CNU3. Upon receiving the Gate message, the CLT 420 may generate a Map message corresponding to the Gate message, as described above, and send the Map message to the same CNU 430, CNU3. The Map message may also indicate the CNU's LLID, LLID3.

The CLT 420 may also respond to the Gate message by forwarding data (e.g., one or more packets) that may be previously received and cached at the CLT 420, without matching the data to the LLID (LLID3) in the received Gate message. For instance, the CLT 420 may forward to the OLT 410 the cached data or packets for other CNUs 430, CNU1 and CNU2, that are not indicated in the Gate message. The packets or data forwarded upstream may be previously assigned corresponding time slots and received by the CLT 420 using previously sent Map messages to the corresponding CNUs 430 (CNU1 and CNU2). The forwarded packets may comprise the LLIDs of the CNUs 430 to indicate the corresponding CNUs, e.g., LLID1 for CNU1 and LLID2 for CNU2. This may enable the OLT 410 to distinguish the data received from different CNUs 430.

After receiving the Map message from the CLT 420, the intended CNU 430 (CNU3) may respond by sending an amount or size of data (e.g., a number of packets) that matches the assigned time slot indicated in the Map message from the CLT 420. The CLT 420 may receive the data and cache the data. The received packets may comprise the sending CNU's LLID, e.g., LLID3 for CNU 3. The CLT 420 may subsequently forward the data for the CNU 430 from the cache when a subsequent Gate message is received, regardless of whether the Gate message indicates the CNU's LLID (LLID3) or another LLID for another CNU 430.

Figure 5:
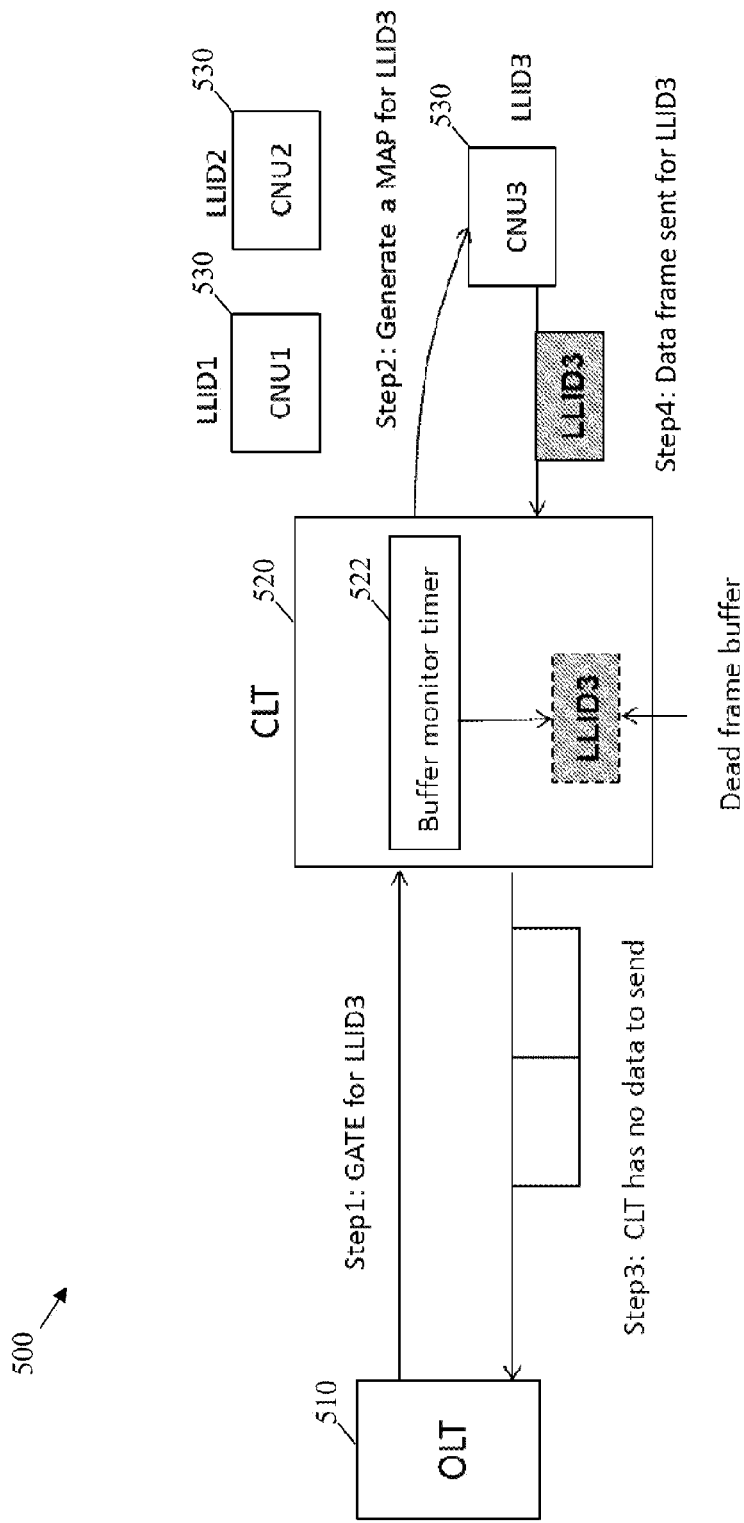
FIG. 5 is a schematic diagram of another embodiment of an EPoC upstream transmission scheme.

FIG. 5 illustrates another embodiment of an EPoC upstream transmission scheme 500, which may be implemented in the EPoC systems described above. The EPoC upstream transmission scheme 500 may be implemented by an OLT 510, a CLT 520, and a plurality of CNUs 530, which may be configured as described above. Initially, the OLT 510 may send to the CLT 520 a Gate message that indicates a LLID for one of the CNUs 530, e.g., LLID3 for CNU3. Upon receiving the Gate message, the CLT 520 may generate a Map message corresponding to the Gate message, as described above, and send the Map message to the same CNU 530 (CNU3). The Map message may also indicate the CNU's LLID, LLID3.

At this point, the CLT's cache may be empty or may not comprise received data from any of the CNUs 530. Thus, the CLT 520 may not forward any CNU data to the OLT 510 upon receiving the Gate message. After receiving the Map message from the CLT 520, the indicated CNU 530 (CNU3) may respond by sending an amount of data that matches the assigned time slot indicated in the Map message from the CLT 520. The CLT 520 may receive the data and cache the data. The received packets may comprise the sending CNU's LLID, e.g., LLID3 for CNU3. Since, the CLT 520 has received the CNU's data after some time delay from receiving the Gate message from the OLT 510, the CLT 520 may not forward the CNU's cached data and instead wait for another Gate message for a next transmission cycle to arrive from the OLT 510. An OLT transmission cycle may correspond to the time window between two transmitted Gate messages. In this situation, the buffer (or cache) at the CLT 520 that holds such data is referred to herein as a dead frame buffer.

To forward the cached data and empty the dead frame buffer (instead of waiting for a next Gate message for the next cycle), the CLT 520 may send a Report message to the OLT 510 to request additional time to forward the cached CNU data. This may be desirable to avoid the situation of receiving subsequent data from the CNUs 530 and overloading the buffer at the CLT 520 before receiving the next Gate message form the OLT 510. The CLT 520 may comprise a buffer monitor timer 522 that may be started upon receiving a Gate message. When the timer expires after a determined buffer wait time, such as equal to one or two polling cycles of the OLT 510, the CLT 520 may send the Report message to the OLT 510 to extend the time window for transmitting upstream data (before exchanging a next Gate message). The CLT 520 may then forward the cached data to the OLT 510. The CLT 520 may send the Report message and forward the cached data before receiving the next Gate message if the buffer monitor timer 522 expires before be the next transmission cycle. Otherwise, the CLT 520 may wait until receiving the next Gate message before forwarding the cached data. By extending the time window and transmitting the cached data in the dead frame buffer, the scheme 500 may avoid wasting or skipping one transmission cycle without sending any data to the OLT 510. Thus, the scheme 500 may improve bandwidth utilization and further reduce the CNU's upstream data transmission cycle (in the case of a dead frame buffer situation).

Figure 6:
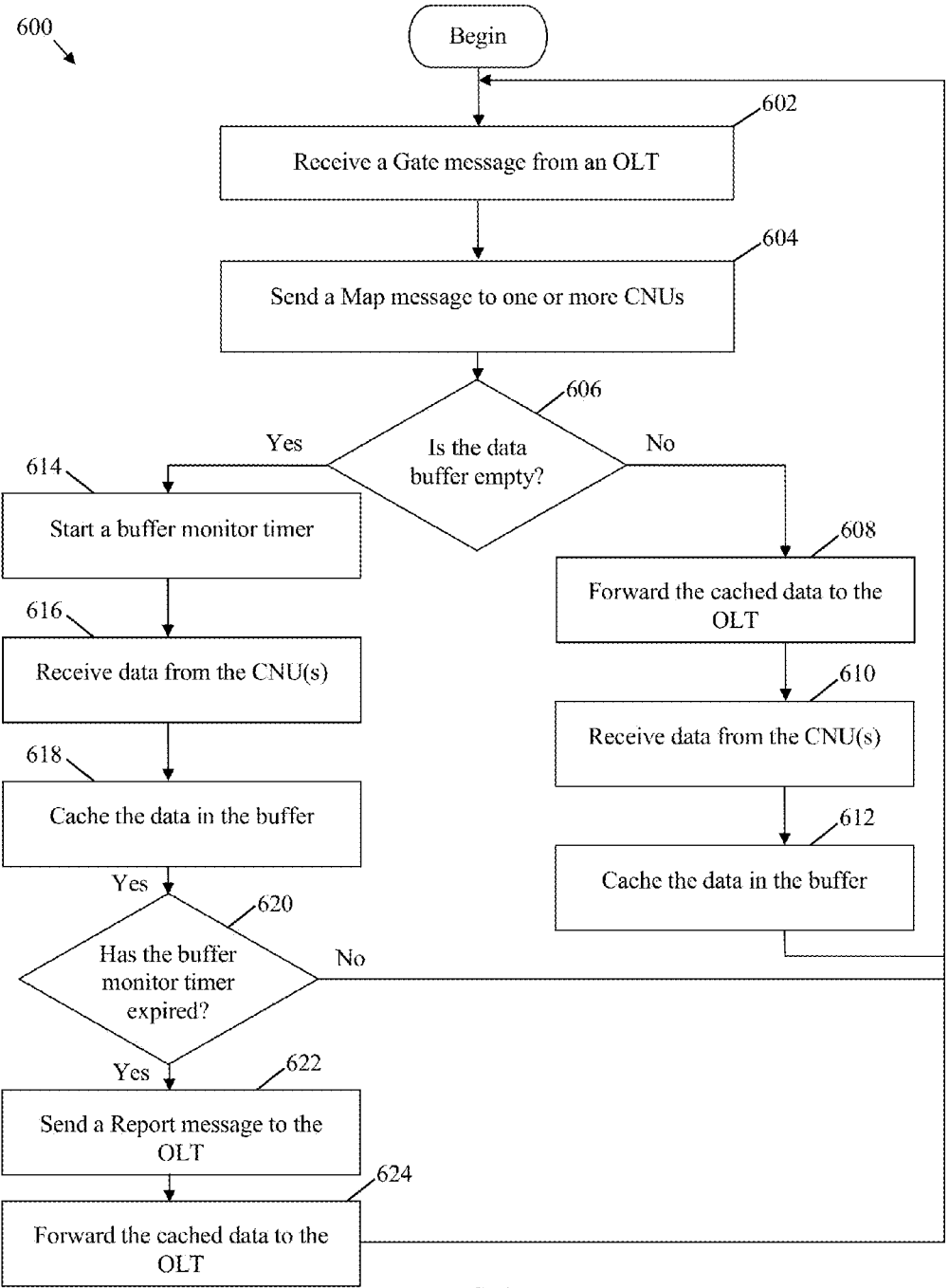
FIG. 6 is a flowchart of an embodiment of an EPoC upstream transmission method.

FIG. 6 illustrates an embodiment of an EPoC upstream transmission method 600, which may be implemented in the EPoC systems and schemes described above. The EPoC upstream transmission method 600 may be implemented by a CLT that may be coupled to and in communications with an OLT and one or more CNUs. The CLT, OLT, and CNUs may be configured as described above. The method 600 may begin at block 602, where a Gate message may be received from an OLT. The CLT may receive from the OLT the Gate message that comprises a LLID indicating a CNU. At block 604, a Map message may be sent to one or more CNUs. Upon receiving the Gate message form the OLT, the CLT may map the time window indicated in the gate message to one or more time slots for one or more CNUs. The time slot(s) of the Map message and the time window of the Gate message may correspond to about the same time period. The CLT may send a Map message to one or more CNUs indicating the mapped time slot and the LLID for each CNU.

At block 606, the method 600 may verify whether a data buffer (for the CLT) is empty. If the condition of block 606 is true, then the method 600 may proceed to block 614. Otherwise, the method 600 may proceed to block 608. At block 608, the cached data (in the buffer) may be forwarded to the OLT. The CLT may forward to the OLT the cached data in the buffer, which may be packets for one or more CNUs. At block 610, data may be received from the CNU(s). The CLT may receive one or more packets from one or more CNUs, e.g., to which the Map messages were sent. At block 612, the data may be cached in the buffer. The CLT may cache the received data until a next Gate message is received. The method 600 may then return to block 602, where a next Gate message is received.

At block 614, a buffer monitor timer may be started. The CLT may start the buffer monitor timer to avoid the dead frame buffer situation described above (in scheme 500). At block 616, data from the CNU(s) may be received. The CLT may receive one or more packets from one or more CNUs, e.g., to which the Map messages were sent. At block 618, the data may be cached in the buffer. At block 620, the method 600 may verify whether the buffer monitor timer has expired. For instance, the buffer monitor timer may be set to one or two transmission or polling cycles of the OLT. If the condition of block 620 is true, then the method 600 may proceed to block 622. Otherwise, the method 600 may return to block 602, where a next Gate message is received before the buffer monitor timer expires. At block 622, a Report message may be sent to the OLT. The CLT may send the Report message to the OLT to extend the time window for the current transmission or polling cycle and empty the dead frame buffer before the next polling cycle. At block 624, the cached data (in the buffer) may be forwarded to the OLT. The method 600 may then return to block 602, where a next Gate message is received.

Figure 7:
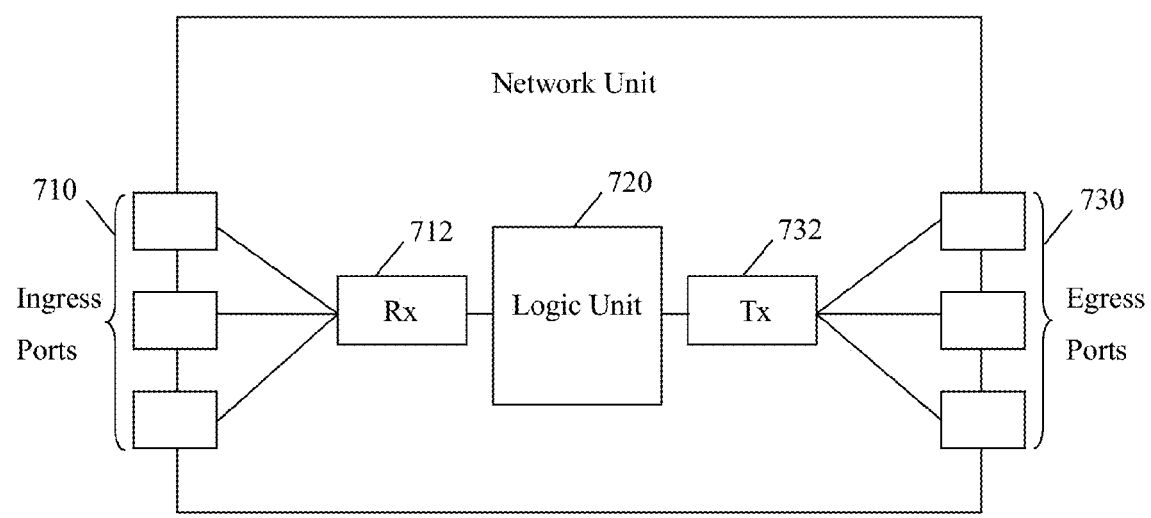
FIG. 7 is a schematic diagram of an embodiment of a network unit.

FIG. 7 illustrates an embodiment of a network unit 700, which may be any device that transports and processes data through an EPoC system, such as the EPoC systems 100 and 200. For instance, the network unit 700 may be located in any of the network components described above, e.g., at the OLT, CLT, or CNU. The network unit 700 may comprise one or more ingress ports or units 710 coupled to a receiver (Rx) 712 for receiving signals and frames/data from other network components. The network unit 700 may comprise a logic unit 720 to determine which network components to send the packets to. The logic unit 720 may be implemented using hardware, software, or both. The network unit 700 may also comprise one or more egress ports or units 730 coupled to a transmitter (Tx) 732 for transmitting signals and frames/data to the other network components. The receiver 712, logic unit 720, and transmitter 732 may also implement or support any of the transmission schemes and methods described above. The components of the network unit 700 may be arranged as shown in FIG. 7.

Figure 8:
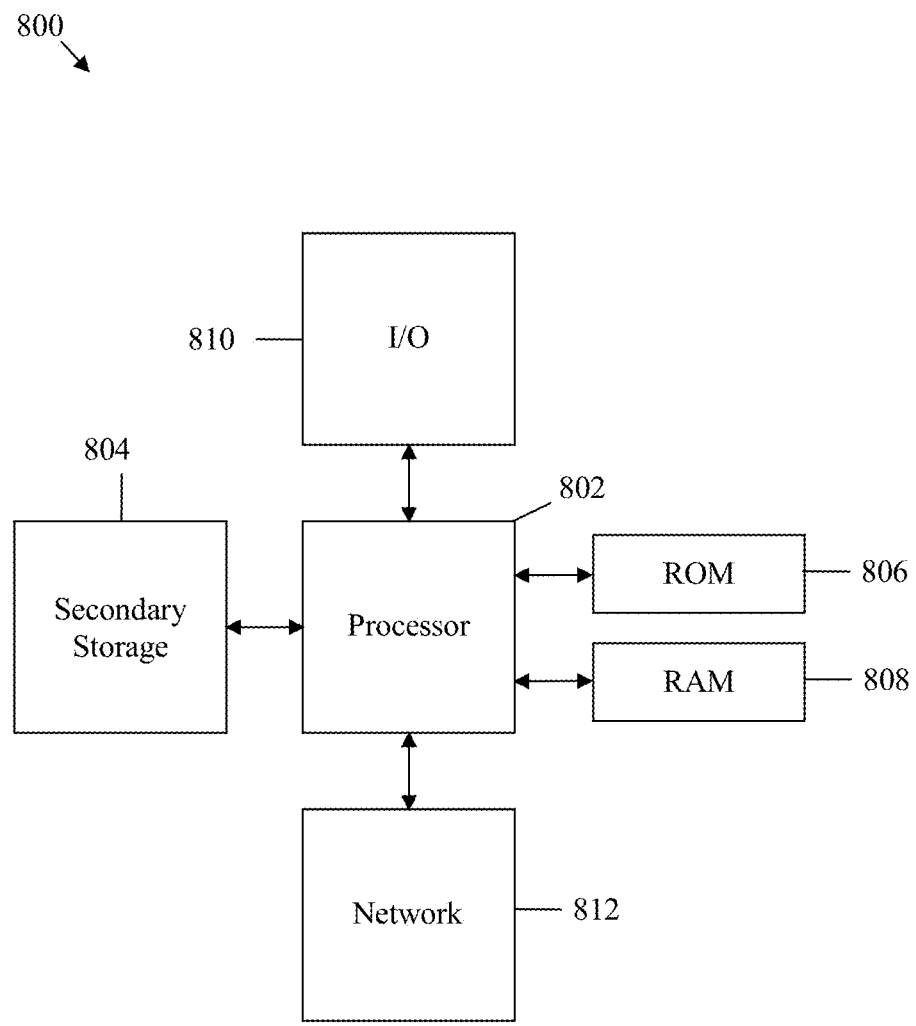
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for interconnecting a fiber-optic network and a coax network, comprising:
 a coax line terminal (CLT) configured to:
  couple to an optical line terminal (OLT) via the fiber-optic network;
  couple to a plurality of coax network units (CNUs) via the coax network;
  receive a first data message comprising a first data from a first of the CNUs;
  cache the first data received from the first CNU;
  subsequent to caching the first data, receive a first upstream scheduling message from the OLT that assigns an upstream transmission cycle for a second of the CNUs, wherein the first CNU is not the second CNU; and
  upon receiving the first upstream scheduling message, forward a data frame of the cached first data from the first CNU to the OLT during the upstream transmission cycle assigned to the second CNU.

2. The apparatus of claim 1, wherein the CLT is further configured to assign a plurality of upstream transmission time slots to the CNUs that are comparable to a plurality of upstream transmission time windows assigned from the OLT for the same CNUs to achieve asynchronous upstream transmissions between the fiber-optic network and the coax network.

3. The apparatus of claim 1, wherein the CLT comprises a plurality of caches for caching a plurality of different priority data frames, and wherein the CLT forwards the different priority data frames from the corresponding caches upon receiving the first upstream scheduling message from the OLT based on priority regardless whether the data frames correspond to the second CNU in the first upstream scheduling message.

4. The apparatus of claim 1, wherein the fiber-optic network is an Ethernet passive optical network (EPON), and wherein the first scheduling message is a Gate message that assigns a polling cycle for the second CNU based on a Multi-Point Control Protocol (MPCP).

5. The apparatus of claim 4, wherein the Gate message comprises a Logical Link Identifier (LLID) that indicates the second CNU, and wherein the CLT forwards the cached first data to the OLT without matching the LLID to the cached first data.

6. The apparatus of claim 4, wherein the CLT is further configured to map the Gate message to a Map message that assigns a comparable upstream transmission time window as the Gate message and broadcast the Map message to the CNUs.

7. The apparatus of claim 6, wherein the CLT assigns one or more time slots that match the upstream transmission time window to one or more of the CNUs that are indicated in the Map message using one or more corresponding LLIDS.

8. The apparatus of claim 1, wherein the CLT is further configured to:
 receive a second upstream scheduling message from the OLT;
 start a buffer monitor timer with a pre-determined expiration time period upon receiving the second upstream scheduling message when the CLT has no cached data;
 receive a second data message comprising a second data from the CNUs subsequent to starting the buffer monitor timer;
 cache the second data received from the CNUs; and
 forward the cached second data to the OLT when the buffer monitor timer expires before receiving a next upstream scheduling message from the OLT.

9. A network component for interconnecting a fiber-optic network with a coax network in a passive optical network (PON) over coax system comprising:
 a receiver configured to:
  receive first data from a plurality of coax network units (CNUs) via the coax network; and
  receive a first PON upstream scheduling message from an optical line terminal (OLT) via the PON that assigns an upstream transmission window for a specified CNU;
 a buffer configured to cache the received first data;
 a processor coupled to the receiver and the buffer and configured to map the upstream transmission time window assigned in the first PON upstream scheduling message according to a PON transmission schedule of the OLT to an upstream transmission time slot according to a coax transmission schedule of the network component;
 an optical transmitter coupled to the buffer and the processor and configured to, in response to receiving the first PON upstream scheduling message at the receiver, forward a data frame of the cached first data in the buffer to the OLT via the PON during the upstream transmission window assigned to the specified CNU, wherein the forwarded data frame corresponds to a CNU that is different from the specified CNU; and
 a coax transmitter coupled to the processor and configured to send a coax upstream scheduling message that comprises the mapped upstream transmission time slot, wherein the coax upstream scheduling message is sent to the CNUs via the coax network.

10. The network component of claim 9, wherein the buffer comprises a plurality of caches for caching a plurality of different priority data frames, and wherein the different priority data frames are forwarded from the corresponding caches upon receiving the first PON upstream scheduling message from the OLT based on priority regardless whether the data frames correspond to the specified CNU in the first PON upstream scheduling message.

11. The network component of claim 9, wherein the time slot is assigned to the specified CNU and is indicated in the coax upstream scheduling message using a Logical Link Identifier (LLID) associated with the specified CNU.

12. The network component of claim 9, wherein the coax transmission schedule of the network component assigns a plurality of time slots for the CNUs that do not overlap with a plurality of time windows in the PON transmission schedule of the OLT that are assigned to the same CNUs.

13. The network component of claim 12, wherein the time slots of the coax transmission schedule that are assigned to the CNUs are about equal to the time windows of the PON transmission schedule that are assigned to the same CNUs.

14. The network component of claim 9 further comprising a buffer monitor timer, wherein the receiver is further configured to receive a second PON upstream scheduling message from the OLT via the PON, and wherein the processor is further configured to:
configure the buffer monitor tinier with a pre-determined expiration time period; and
upon receiving the second PON upstream scheduling message when the buffer is empty of data from the CNUs, start the buffer monitor timer with the pre-determined expiration time period.

15. The network component of claim 14, wherein the receiver is further configured to receive second data from the CNUs after starting the buffer monitor timer, wherein the buffer is further configured to cache the second data received from the CNUs, and wherein the transmitter is further configured to forward the second data to the OLT when the buffer monitor timer expires before receiving a next PON upstream scheduling message.

16. A method implemented by an apparatus for interconnecting a fiber-optic network and a coax network comprising:
receiving first data from a coax network unit (CNU) via the coax network;
caching the received first data in a local buffer;
subsequent to caching the first data, receiving from an optical line terminal (OLT) via the fiber-optic network a first message that assigns a first upstream transmission window for a specified CNU based on a first time schedule of the OLT;
forwarding the cached first data in the buffer to the OLT during the first upstream transmission window regardless of whether the specified CNU matches the CNU corresponding to the cached first data;
receiving from the OLT a second message that assigns a second upstream transmission window;
configuring a buffer monitor timer with a pre-determined expiration period;
after forwarding the cached first data to the OLT and upon receiving the second message when the local buffer is empty of data from the coax network, starting the buffer monitor timer with the pre-determined expiration time period upon receiving the second message;
receiving second data from the CNU via the coax network after starting the buffer monitor timer;
caching the second data in the local buffer;
sending a third message to the OLT to request extending the second upstream transmission window; and
forwarding the cached second data to the OLT when the buffer monitor timer expires before receiving a next message from the OLT that assigns a next upstream transmission window.

17. The method of claim 16, wherein the local buffer comprises a plurality of caches for caching a plurality of different priority data frames, and wherein the different priority data frames are forwarded from the corresponding caches upon receiving the first message from the OLT based on priority regardless whether the data frames correspond to the specified CNU in the first message.

18. The method of claim 16 further comprising:
mapping the first upstream transmission window to a comparable upstream transmission time slot based on a second time schedule for the coax network; and
sending to the coax network a coax upstream scheduling message that assigns the upstream transmission time slot to the specified CNU.

19. The method of claim 16, wherein the pre-determined expiration time period is about one or about two Multi-Point Control Protocol (MPCP) polling cycles.

20. The method of claim 16, wherein the first message, the second message, and the next message are Ethernet passive optical network (EPON) MPCP Gate messages, and wherein the third message is an EPON MPCP Report message.

* * * * *

UNITED STATES PATENT AND TRADEMARK OFFICE
CERTIFICATE OF CORRECTION

PATENT NO. : 8,873,565 B2  
APPLICATION NO. : 13/447748  
DATED : October 28, 2014  
INVENTOR(S) : Liming Fang, Jim Chen and Kira Zhang Page 1 of 1

It is certified that error appears in the above-identified patent and that said Letters Patent is hereby corrected as shown below:

In the Claims

Column 13 lines 1-11, Claim 14 should read:

The network component of claim 9 further comprising a buffer monitor timer, wherein the receiver is further configured to receive a second PON upstream scheduling message from the OLT via the PON, and wherein the processor is further configured to:
configure the buffer monitor timer with a pre-determined expiration time period; and
upon receiving the second PON upstream scheduling message when the buffer is empty of data from the CNUs, start the buffer monitor timer with the pre-determined expiration time period.

Signed and Sealed this
Seventeenth Day of February, 2015

Michelle K. Lee
*Deputy Director of the United States Patent and Trademark Office*